(No Model.)
A. A. KEENE.
THERMOMETER.
No. 521,374. Patented June 12, 1894.
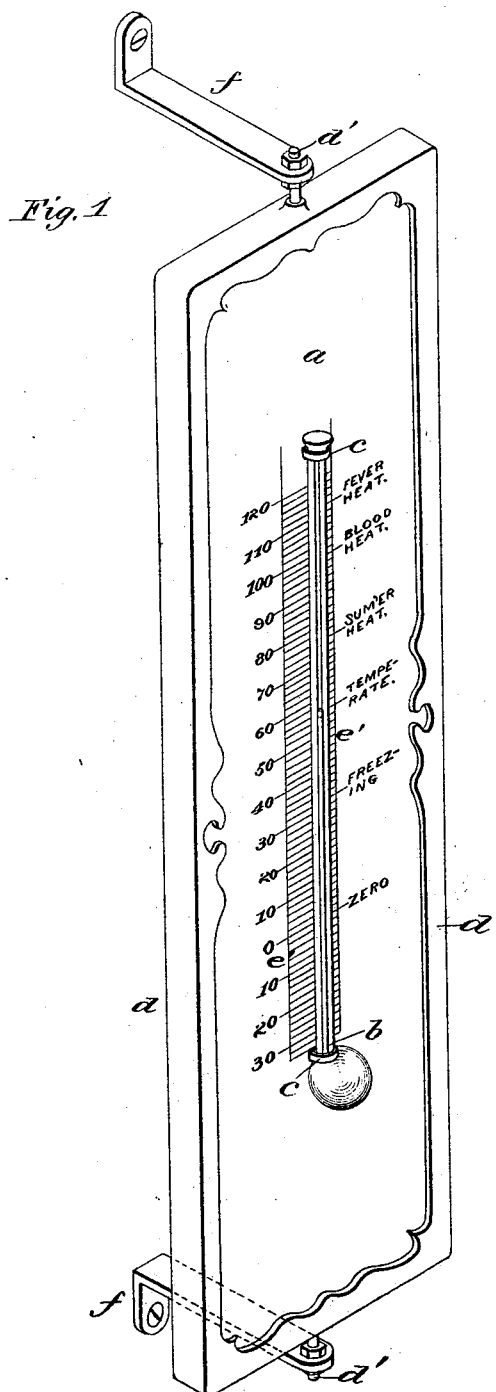
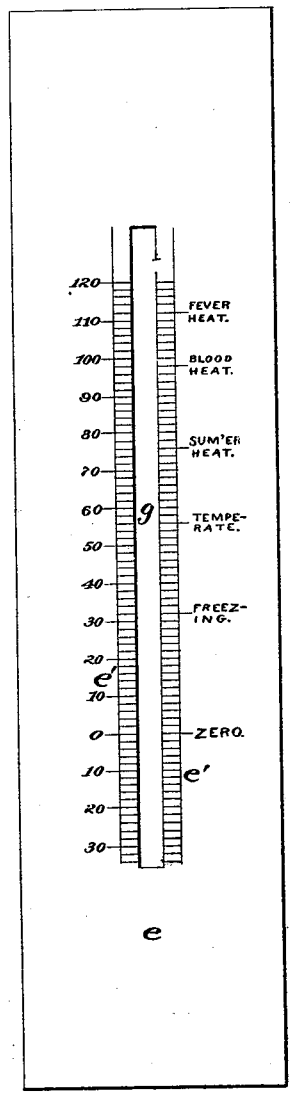
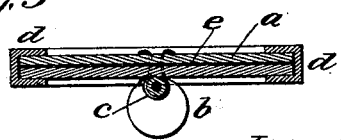
Witnesses:
J. F. Coleman
M. B. May
Inventor
Albert A. Keene.
By Chas. L. Burdett
Att'y.

UNITED STATES PATENT OFFICE.

ALBERT A. KEENE, OF PHILADELPHIA, PENNSYLVANIA.

THERMOMETER.

SPECIFICATION forming part of Letters Patent No. 521,374, dated June 12, 1894.

Application filed February 19, 1894. Serial No. 500,814. (No model.)

*To all whom it may concern:*

Be it known that I, ALBERT A. KEENE, a citizen of the United States, residing at Philadelphia, in the county of Philadelphia and State of Pennsylvania, have invented certain new and useful Improvements in Thermometers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a thermometer which may be fixed in any desirable position as outside a window and to enable the scale to be easily read from within the room, the thermometer being of comparatively cheap and novel construction for such a use.

To this end my invention consists in the details of the several parts making up the thermometer and in the combination of such parts as more particularly hereinafter described and recited in the claims.

Referring to the drawings:—Figure 1 is a view in elevation of the thermometer showing brackets for attaching it to a fixed object. Fig. 2 is a detail in elevation of the translucent scale. Fig. 3 is a detail view in cross section of the thermometer.

In the accompanying drawings the letter $a$ denotes the body part of the thermometer to which the bulb and tube $b$ are secured as by means of clamps $c$ which encircle the tube near the ends and extend through holes in the body part. The body part is made of glass or light transparent material in two strips or plates held together by a frame $d$, which extends along the edges of the body part to bind the two layers together. Between these two layers there is held a scale strip $e$ made of translucent material with graduated scale $e'$ marked on the strip in proper position with respect to the thermometer tube so as to enable the position of the fluid within the tube to be read from the scale. This strip is made preferably of paper treated with a material which renders it translucent while giving to the whole body part the appearance of ground glass. The frame $d$ is made of any convenient material preferably metal, and secured to the body part in any convenient manner. It is desirable that the two plates of glass forming the body part, should be so secured together as to prevent the access of moisture between the parts, and this may be accomplished by the use of a cement smeared along the meeting edges of the strips and covered by the frame $d$. Other convenient means may be adopted for holding the layers which compose the body part together. A metallic frame $d$ is preferred as projections $d'$ may be held to serve as means for attachment for the thermometer and the frame as a whole to brackets $f$, by means of which the thermometer may be secured in any convenient position.

A modified form of scales strip, such as shown in Fig. 2 of the drawings, has a lengthwise slot $g$ along the center of the scale in order to enable the thermometer to be read easily from either face, and the light striking through the slot also serving to aid the reading from the front side of the thermometer.

I claim as my invention—

1. As an improved article of manufacture, a thermometer having a transparent body part comprised of layers of glass, a scale strip of translucent material secured between the two layers and bearing a graduated scale, and a thermometer bulb and tube secured to the body part in proper relation to the scale, and means for securing the layers together, all substantially as described.

2. In combination in a thermometer a transparent body part comprised of two layers of glass, a scale strip of translucent material secured between the two layers and bearing a graduated scale, a thermometer tube and bulb secured to the body part, and a frame extending around the edges of the body part, substantially as described.

3. In combination in a thermometer, a transparent body part composed of two layers of glass, a scale strip of translucent material secured between the two layers, a moisture proof layer extending around the edges of the body part, a thermometer tube secured to the body part, all substantially as described.

In testimony whereof I affix my signature in presence of two witnesses.

ALBERT A. KEENE.

Witnesses:
CHAS. L. BURDETT,
J. F. COLEMAN.